United States Patent
Fischer et al.

(10) Patent No.: US 9,518,501 B2
(45) Date of Patent: Dec. 13, 2016

(54) EXHAUST MANIFOLD FOR EXHAUST SYSTEM OF A COMBUSTION ENGINE

(71) Applicant: BENTELER AUTOMOBILTECHNIK GMBH, Paderborn (DE)

(72) Inventors: Uwe Fischer, Bad Arolsen (DE); Tobias Gockel, Meschede (DE); Ali Asgar Kharwawala, Paderborn (DE); Elmar Grussmann, Altenbeke-Buke (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 14/660,511

(22) Filed: Mar. 17, 2015

(65) Prior Publication Data

US 2015/0267597 A1    Sep. 24, 2015

(30) Foreign Application Priority Data

Mar. 20, 2014 (DE) .......................... 10 2014 103 820

(51) Int. Cl.
  *F01N 13/10*   (2010.01)
  *F01N 13/14*   (2010.01)
  (Continued)

(52) U.S. Cl.
  CPC ............ *F01N 13/10* (2013.01); *F01N 13/102* (2013.01); *F01N 13/143* (2013.01); *F01N 13/16* (2013.01);
  (Continued)

(58) Field of Classification Search
  CPC ...... F01N 13/10; F01N 13/102; F01N 13/105; F01N 13/143; F01N 13/16; F01N 13/1805; F01N 13/1894; F01N 2260/10; F01N 2260/20; F01N 2340/00; F01N 2530/04
  (Continued)

(56) References Cited

U.S. PATENT DOCUMENTS

| 3,872,667 A * | 3/1975 | Rosenlund ................ F01N 3/26 422/173 |
| 5,729,975 A * | 3/1998 | Bekkering ............ F01N 13/102 60/323 |

(Continued)

FOREIGN PATENT DOCUMENTS

| DE | 4444760 | 6/1996 |
| DE | 10102637 | 7/2002 |

(Continued)

OTHER PUBLICATIONS

European Search Report issued on Jul. 17, 2015 by the European Patent Office in corresponding European Patent Application No. EP 15 15 5466.

(Continued)

*Primary Examiner* — Jorge Leon, Jr.
(74) *Attorney, Agent, or Firm* — Henry M. Feiereisen LLC.

(57) ABSTRACT

An exhaust manifold for an exhaust system of a combustion engine includes an internal pipe system having a plurality of pipe sections and an outer shell which is disposed in spaced-apart surrounding relationship to the internal pipe system and joined to an outlet flange. The outlet flange includes a neck portion, an outer flange portion adjacent to the neck portion, and an inwardly directed shoulder portion which extends from the neck portion outwards, with the outer shell being joined at the shoulder portion to the outlet flange.

13 Claims, 3 Drawing Sheets

(51) Int. Cl.
*F01N 13/16* (2010.01)
*F16L 21/00* (2006.01)
*F16L 23/00* (2006.01)
*F01N 13/18* (2010.01)

(52) U.S. Cl.
CPC ....... *F01N 13/1811* (2013.01); *F01N 13/1872* (2013.01); *F16L 21/00* (2013.01); *F16L 23/00* (2013.01); *F01N 13/1805* (2013.01); *F01N 13/1894* (2013.01); *F01N 2260/10* (2013.01); *F01N 2260/20* (2013.01); *F01N 2340/00* (2013.01); *F01N 2530/04* (2013.01)

(58) Field of Classification Search
USPC .................................................. 60/323, 324
See application file for complete search history.

(56) References Cited

U.S. PATENT DOCUMENTS

| | | | |
|---|---|---|---|
| 6,038,769 A * | 3/2000 | Bonny | F01N 13/102 29/890.054 |
| 7,198,459 B2 | 4/2007 | Grussmann et al. | |
| 8,312,721 B2 | 11/2012 | Smatloch et al. | |
| 8,382,429 B2 | 2/2013 | Smatloch et al. | |
| 8,549,851 B2 | 10/2013 | Grussmann et al. | |
| 8,628,296 B2 | 1/2014 | Smatloch et al. | |
| 8,826,660 B2 | 9/2014 | Gockel et al. | |
| 2002/0166720 A1 | 11/2002 | Kusabiraki et al. | |
| 2005/0072143 A1* | 4/2005 | Diez | F01N 13/102 60/321 |
| 2005/0126163 A1* | 6/2005 | Bjornsson | F01N 13/102 60/323 |
| 2005/0133012 A1 | 6/2005 | Grussmann et al. | |
| 2005/0183414 A1* | 8/2005 | Bien | F01N 13/10 60/323 |
| 2009/0007552 A1* | 1/2009 | Schmidt | F01N 13/10 60/323 |
| 2009/0064670 A1* | 3/2009 | Kimura | B22C 9/24 60/323 |
| 2009/0139220 A1* | 6/2009 | Schmelzer | F01N 13/102 60/323 |
| 2009/0158724 A1 | 6/2009 | Muller | |
| 2009/0188247 A1* | 7/2009 | Phillips, Jr. | F01N 13/102 60/323 |
| 2010/0038901 A1 | 2/2010 | Schmidt et al. | |
| 2010/0098533 A1 | 4/2010 | Smatloch et al. | |
| 2010/0223911 A1 | 9/2010 | Gockel et al. | |
| 2011/0131985 A1 | 6/2011 | Smatloch et al. | |
| 2011/0236191 A1 | 9/2011 | Smatloch et al. | |
| 2011/0286837 A1 | 11/2011 | Smatloch et al. | |
| 2011/0308238 A1* | 12/2011 | Grussmann | F01N 13/10 60/323 |
| 2014/0366525 A1* | 12/2014 | Wagner | F02B 37/025 60/598 |

FOREIGN PATENT DOCUMENTS

| | | |
|---|---|---|
| DE | 10220986 | 11/2003 |
| DE | 102007062661 | 6/2009 |
| DE | 102009030014 | 12/2010 |
| DE | 10 2012 203 181 | 9/2013 |
| DE | 10 2013 211 390 | 12/2014 |
| EP | 0 744 537 | 11/1996 |
| EP | 0955453 | 11/1999 |
| WO | WO2010/019268 | 2/2010 |

OTHER PUBLICATIONS

Translation of European Search Report issued on Jul. 17, 2015 by the European Patent Office in corresponding European Patent Application No. EP 15 15 5466.

* cited by examiner

EXHAUST MANIFOLD FOR EXHAUST SYSTEM OF A COMBUSTION ENGINE

CROSS-REFERENCES TO RELATED APPLICATIONS

This application claims the priority of German Patent Application, Serial No. DE 10 2014 103 820.7, filed Mar. 20, 2014, pursuant to 35 U.S.C. 119(a)-(d), the disclosure of which is incorporated herein by reference in its entirety as if fully set forth herein.

BACKGROUND OF THE INVENTION

The present invention relates to an exhaust manifold for an exhaust system of a combustion engine.

The following discussion of related art is provided to assist the reader in understanding the advantages of the invention, and is not to be construed as an admission that this related art is prior art to this invention.

An exhaust manifold is a component of the exhaust system of combustion engines and has an internal pipe system and an outer shell which surrounds the internal pipe system. The exhaust manifold serves to unite or collect exhaust gas, which exits the individual cylinders and enters the exhaust manifold via inlet openings, and to feed the exhaust gas to a common exhaust-gas outlet. For this purpose, such an exhaust manifold is flange-mounted directly onto the engine or the cylinder head of the engine. Thus, the exhaust manifold, also called in the art as exhaust collector, forms the inlet zone of an exhaust system. As the combustion engine and thus the exhaust system, in particular the exhaust manifold, heats up and cools down, various zones of the exhaust manifold are exposed to different temperatures. As a result of the temperature differences, these zones of the exhaust manifold expand differently and thus are subject to different tensile and/or compressive forces. In addition, shear movements or plastic deformation may be experienced.

Regions adjacent to the inlet openings are exposed to less thermal stress than a region where the exhaust ducts of the internal pipe system come together in an outlet flange in which an increased mass flow of hot exhaust gases and a deflection of the exhaust gases takes place. This region forms an interface between outer system or outer shell and outlet flange, which is exposed to intense thermo-mechanical stress. Depending on the construction of the exhaust manifold and the connection to the outlet flange, it is necessary to adapt the outer system to the thermo-mechanical stress. This may be realized by making the wall thicker or by using material of higher quality. Also the addition of further components may increase the thermo-mechanical robustness at this critical region. The downside of all these approaches is the increase in weight and costs.

It would therefore be desirable and advantageous to provide an improved exhaust manifold to obviate prior art shortcomings.

SUMMARY OF THE INVENTION

According to one aspect of the present invention, an exhaust manifold for an exhaust system of a combustion engine includes an internal pipe system having a plurality of pipe sections, an outer shell in spaced-apart surrounding relationship to the internal pipe system, and an outlet flange including a neck portion, an outer flange portion adjacent to the neck portion, and an inwardly directed shoulder portion extending from the neck portion outwards, with the outer shell being joined at the shoulder portion to the outlet flange.

An exhaust manifold according to the invention thus has an internal pipe system with several pipe sections. The pipe sections as well as the internal pipe system may be composed of shell members, at least in part. By effectively extending the outlet flange with the formation of a shoulder portion, the thermo-mechanical stress is redirected towards the entire outer system and thus shifted to thermo-mechanically robust regions. The outlet flange is extended up to the thermo-mechanically critical regions. By respectively configuring the outlet flange and in particular the shoulder portion thereof in terms of wall thickness, shape and optionally material selection, thermo-mechanical stress is shifted to non-critical regions in the supporting outer system. As a result, the thermo-mechanical robustness of the exhaust manifold can be increased, and especially plastic expansions in thermo-mechanically critical regions are reduced so that service life is significantly increased. Moreover, the wall thickness of the outer shell can be reduced. As a result, an exhaust manifold according to the present invention can be built overall of reduced weight and thin-walled, even though the outlet flange may be more compact and possibly heavier, so that the thermal mass and thus the response behavior of a downstream catalytic converter can be improved after a cold start. Furthermore, components or regions of the exhaust manifold can be made of materials that are of less quality so that costs are reduced and the need for reinforcements or the like in thermo-mechanically critical regions can be eliminated.

According to another advantageous feature of the present invention, the shoulder portion can have a mean wall thickness which can be greater than a wall thickness of the outer shell. Advantageously, the mean wall thickness can be greater or equal to twice a wall thickness of the outer shell.

According to another advantageous feature of the present invention, the shoulder portion can be configured to taper to a free end thereof. This configuration enhances both flow dynamics and force flow as a result of thermal expansions.

According to another advantageous feature of the present invention, the outer shell can rest upon an outer side of the shoulder portion and be joined to the outlet flange. This is advantageous in terms of production and in terms of a decrease in thermo-mechanical stress.

According to another advantageous feature of the present invention, the shoulder portion can have a length which, as measured in a longitudinal direction of the outer shell, can be greater than a length of the shoulder portion in transverse direction. The outer circumference of the shoulder portion thus receives a substantial oval contour. Also, the length of the shoulder portion, as measured in the longitudinal direction of the outer shell, can be greater than a length or diameter of the outer flange portion. The outlet flange assumes the connection and sealing to the downstream exhaust components of the exhaust system, such as a turbocharger for example. Coupling is realized via the outer flange portion. The inner shoulder portion extending in the form of a ring about the neck portion stabilizes the transition. The shoulder portion assumes a support function in the outer system of the exhaust manifold and absorbs also the thermo-mechanical stress.

The outer shell may be of single-piece configuration. Currently preferred is, however, an outer shell which is composed of several shell members. Advantageously, the outer shell can be comprised of at least two shell members having edges connected to one another.

According to another advantageous feature of the present invention, an inlet flange can be configured for attachment to a cylinder head of the combustion engine.

An exhaust manifold according to the present invention thus can have an outer shell which has reduced wall thickness and allows the use of cheaper material exhibiting less thermo-mechanical strength properties. Both the outlet flange and the inlet flange may be produced as cast parts, especially made of heat-resistant special steel castings. The outer shell or the shell members of the outer shell may be made of stainless steel, advantageously rust-proof austenitic steel, such as chrome-nickel steel or chrome-nickel-titanium steel.

BRIEF DESCRIPTION OF THE DRAWING

Other features and advantages of the present invention will be more readily apparent upon reading the following description of currently preferred exemplified embodiments of the invention with reference to the accompanying drawings, in which.

DETAILED DESCRIPTION OF PREFERRED EMBODIMENTS

Figure 1:
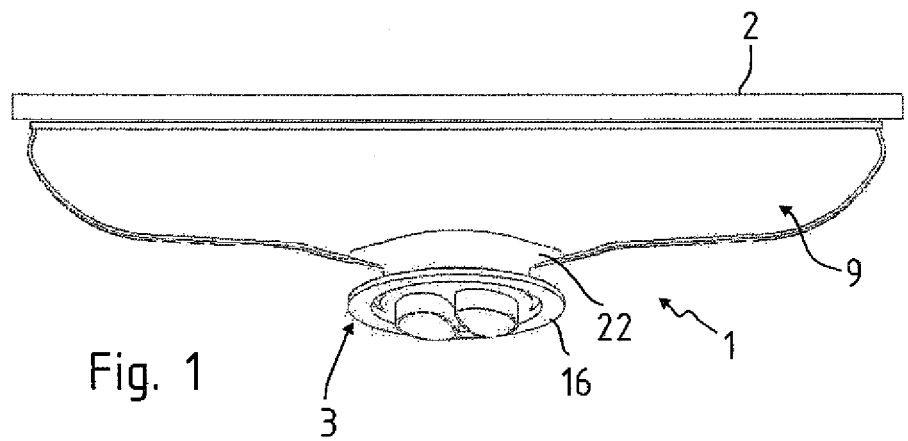
FIG. 1 is an illustration of an exhaust manifold according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 3:
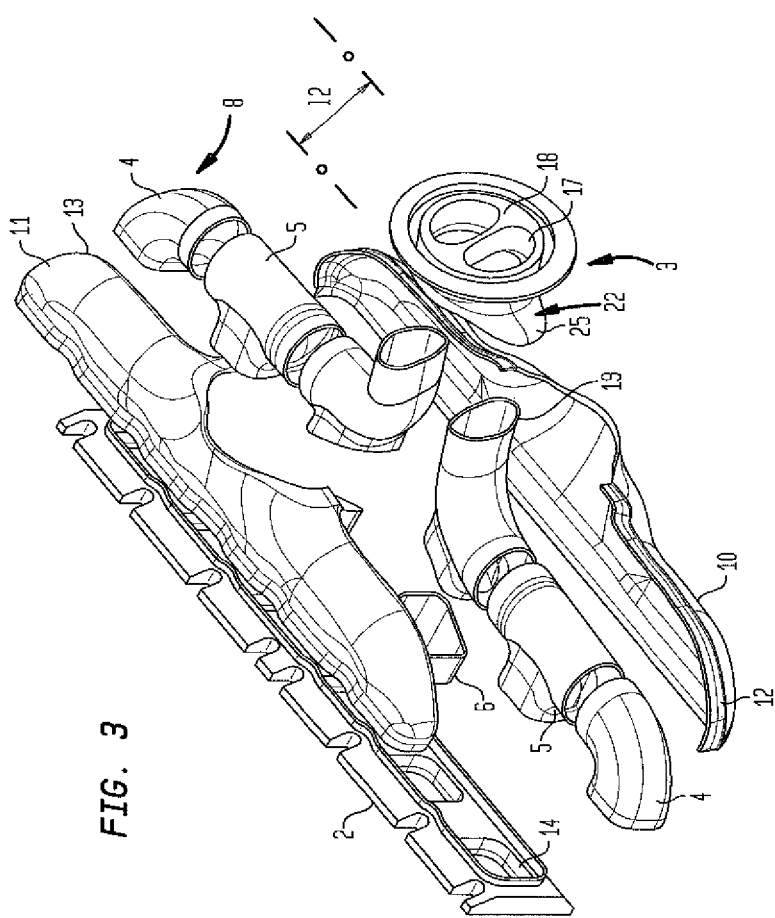
FIG. 3 is an exploded illustration of the components of the exhaust manifold.
Figure 4:
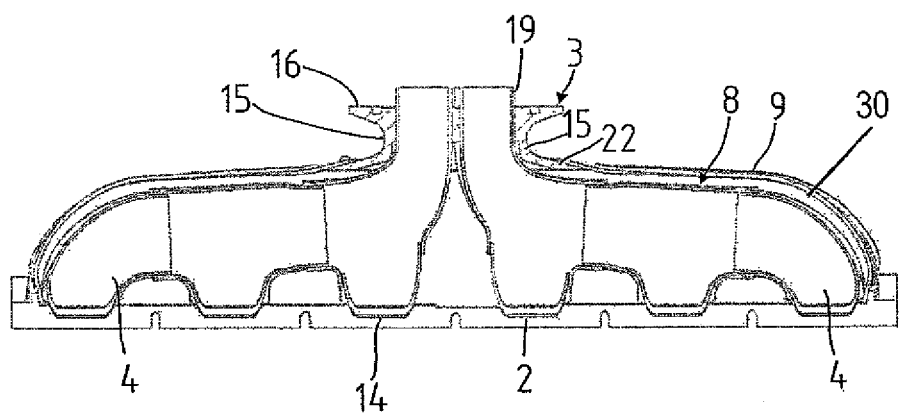
FIG. 4 is a longitudinal section through the exhaust manifold.
Figure 5:
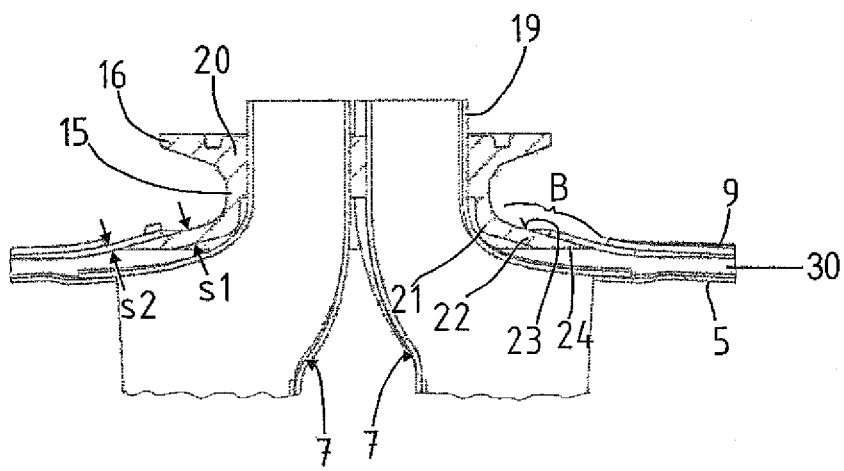
FIG. 5 is an enlarged detailed view of the exhaust manifold of FIG. 4, illustrating an area around the outlet flange.

Turning now to the drawing, and in particular to FIG. 1, there is shown an illustration of an exhaust manifold according to the present invention, generally designated by reference numeral 1 for an exhaust system of a combustion engine. The exhaust manifold 1, e.g. an air gap insulated exhaust manifold, includes an inlet flange 2, an outlet flange 3, an internal pipe system 8 (FIG. 3) comprised of several pipe sections 4, 5, 6, 7, and an outer shell 9 in spaced-apart surrounding relationship to the internal pipe system 8 to thereby define an air gap 30 (FIGS. 4, 5). The outer shell 9 is comprised of two shell members 10, 11 defining a bottom shell and a top shell. The shell members 10, 11 have overlapping edges 12, 13 which are connected to one another, in particular welded to one another.

The inlet flange 2 has inlet openings 14 (FIG. 4) via which exhaust gas exiting the individual cylinders of the combustion engine flows into the pipe sections 4, 5, 6, 7. The exhaust gas is collected via the pipe sections 4, 5, 6, 7, deflected and fed to the outlet flange 3. The inner pipe system 8 is configured symmetrically in relation to its vertical center axis. The pipe sections 4 involve two bends. The pipe sections 5 involve two T-pieces. The pipe sections 6 involve two fittings, and the pipe sections 7 involve two collecting pipe sections.

The outlet flange 3 includes a neck portion 15 and an outer flange portion 16 adjacent to the neck portion 15. The outer flange portion 16 is used to provide the coupling of the exhaust manifold 1 to downstream exhaust components, in particular an exhaust pipe or a turbocharger. The outer flange portion 16 assumes hereby connecting and sealing functions. At the outlet side thereof, the outlet flange 3 is provided with two semicircular receiving openings 17 which are separated by a central bridge 18 (FIG. 3). The collecting pipe sections 7 have outlet sections 19 which end in the receiving openings 17. The outlet sections 19 have hereby a configuration to fit the receiving openings 17 in a form-fitting manner. The receiving openings 17 and the central bridge 18 are formed in a disk-shaped base body 20 of the outlet flange 3. The flange portion 16 extends on the outlet side from the base body 20 radially outwards. The neck portion 15 is arranged adjacent to the base body 20 in the direction of the outer shell 9 and the internal pipe system 8 and transitions via an arched section 21 into an inner shoulder portion 22 which extends radially outwards (FIG. 5).

The shoulder portion 22 is ring-shaped and extends from the neck portion outwards in the direction of the outer shell 9. The outer shell 9 is joined to the shoulder portion 22 for connection with the outlet flange 3. The outer shell 9 rests hereby upon an outer side 23 of the shoulder portion 22 and is joined to the shoulder portion 22 by an all-around joint connection, especially welding seam.

As shown in particular in FIGS. 4 and 5, the shoulder portion 22 descends in slightly inclined configuration in the direction of the outer shell 9. The outer shell 9 has a complementing contour to extend upon the shoulder portion 22 in a substantially gradual manner (continuous transition).

The shoulder portion 22 is dimensioned such as to extend up to the thermo-mechanical critical regions B or zone of the outer shell 9 of the exhaust manifold 1. The region B is clearly shown in FIG. 5 on a side of the outer shell 9 in an area of the collecting pipe sections 7, where the exhaust flows come together and are deflected. The region B extends all-around about the outlet flange 3 or the shoulder portion 22. The shoulder portion 22 ends approximately at a level with the transition from the T-shaped pipe 5 to the collecting pipe 7 by connecting the pipe sections 5, 7 within one another.

The shoulder portion 22 has a robust structure and absorbs the thermo-mechanical high stress in the thermally critical region B. The shoulder portion 22 has a mean wall thickness $s_1$ which is greater than a wall thickness $s_2$ of the outer shell 9. Advantageously, the mean wall thickness $s_1$ of the shoulder portion 22 is greater or equal to twice the wall thickness $s_2$ of the outer shell 9. The mean wall thickness $s_1$ is measured in the length section of the shoulder portion 22 which length section extends from the neck portion 15 radially in a straight line outwards, before the shoulder portion 22 tapers towards the free end 24.

Figure 2:
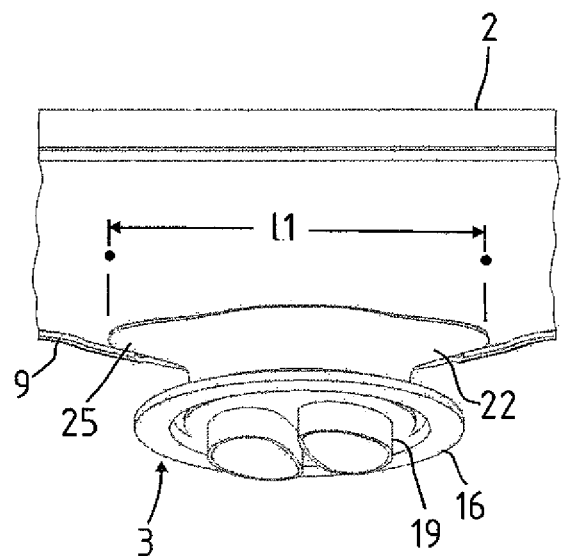
FIG. 2 is an enlarged detailed view of an outlet flange of the exhaust manifold.

The shoulder portion 22 has a length $l_1$ (FIG. 2) which is suited to the assigned function of absorbing the thermo-mechanical stress. Accordingly, the length $l_1$ of the shoulder portion 22 extends up to the thermally critical zone and is greater than a length $l_2$ (FIG. 3) of the shoulder portion 22 in transverse or vertical direction, when measured in longitudinal direction of the outer shell 9. Thus, the shoulder portion 22 has wing zones 25 which extend in longitudinal direction.

To reduce the thermo-mechanical stress at the interface between the outer shell 9 and the outlet flange 3, the outlet flange 3 is extended up to the thermo-critical regions B. This is realized via the inner shoulder portion 22 pointing towards the outer shell 9 and extending outwards from the neck portion 15.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. An exhaust manifold for an exhaust system of a combustion engine, comprising:
    an internal pipe system having a plurality of pipe sections;
    an outer shell in spaced-apart surrounding relationship to the internal pipe system; and
    an outlet flange assembly comprising a neck portion, an outer flange portion adjacent to the neck portion, and an inwardly directed shoulder portion extending from the neck portion outwards,
    wherein the outlet flange assembly is separate from the outer shell, said outer shell being joined at the shoulder portion to the outlet flange assembly, leaving the neck portion and the outer flange portion exposed.

2. The exhaust flange of claim 1, wherein the shoulder portion has a mean wall thickness which is greater than a wall thickness of the outer shell.

3. The exhaust flange of claim 1, wherein the shoulder portion has a mean wall thickness which is greater or equal to twice a wall thickness of the outer shell.

4. The exhaust flange of claim 1, wherein the shoulder portion is configured to taper to a free end thereof.

5. The exhaust flange of claim 1, wherein the outer shell rests upon an outer side of the shoulder portion and is joined to the outlet flange assembly.

6. The exhaust flange of claim 1, wherein the shoulder portion has a length, as measured in a longitudinal direction of the outer shell, the length of the shoulder portion being greater than a length of the shoulder portion in transverse direction.

7. The exhaust flange of claim 1, wherein the outer shell is comprised of at least two shell members having edges connected to one another.

8. The exhaust flange of claim 1, further comprising an inlet flange configured for attachment to a cylinder head of the combustion engine.

9. The exhaust flange of claim 1, wherein the outlet flange assembly and the inlet flange are cast parts.

10. The exhaust flange of claim 1, wherein the outlet flange assembly and the inlet flange are heat-resistant steel castings.

11. The exhaust flange of claim 1, wherein the outer shell is made of stainless steel.

12. The exhaust flange of claim 1, wherein the outer shell is made of rust-proof austenitic steel.

13. The exhaust flange of claim 12, wherein the austenitic steel is chrome-nickel steel or chrome-nickel-titanium steel.

* * * * *